United States Patent
Tanner

(10) Patent No.: US 9,441,089 B2
(45) Date of Patent: Sep. 13, 2016

(54) DISPERSANTS

(71) Applicant: Ethox Chemicals, LLC, Greenville, SC (US)

(72) Inventor: James T. Tanner, Greer, SC (US)

(73) Assignee: Ethox Chemicals, LLC, Greenville, SC (US)

( * ) Notice: Subject to any disclaimer, the term of this patent is extended or adjusted under 35 U.S.C. 154(b) by 75 days.

(21) Appl. No.: 14/217,029

(22) Filed: Mar. 17, 2014

(65) Prior Publication Data

US 2014/0275380 A1 Sep. 18, 2014

Related U.S. Application Data

(60) Provisional application No. 61/786,709, filed on Mar. 15, 2013.

(51) Int. Cl.
| | |
|---|---|
| *C08K 5/101* | (2006.01) |
| *C08K 5/42* | (2006.01) |
| *C08K 5/521* | (2006.01) |

(52) U.S. Cl.
CPC .............. *C08K 5/101* (2013.01); *C08K 5/42* (2013.01); *C08K 5/521* (2013.01)

(58) Field of Classification Search
CPC .......... C08K 5/56; C08K 5/101; C08K 5/16; C08K 5/42; C08K 5/521
See application file for complete search history.

(56) References Cited

U.S. PATENT DOCUMENTS

| | | | |
|---|---|---|---|
| 2007/0004848 A1* | 1/2007 | Hintzer et al. ................ | 524/544 |
| 2011/0166290 A1* | 7/2011 | Moncla et al. ............... | 524/562 |

FOREIGN PATENT DOCUMENTS

| | | | |
|---|---|---|---|
| JP | 56030948 | * | 3/1981 |

OTHER PUBLICATIONS

Hreczuch et al. Przemsyl Chemiczny 2009.*

* cited by examiner

*Primary Examiner* — Mark Kaucher
(74) *Attorney, Agent, or Firm* — Joseph T. Guy; Perkins Law Firm, LLC

(57) ABSTRACT

The present invention relates to novel dispersants based on reaction products of two and one moles respectively of the branched ester alcohol or alkokylated ester alcohol with maleic anhydride that has been subjected to a further sulfonation reaction. The compounds are useful as dispersing and wetting agents. The invention further relates to the use of the dispersants of the invention to produce stable aqueous dispersions of high performance thermoplastic polymers.

2 Claims, No Drawings

DISPERSANTS

This application claims the priority benefit under 35 U.S.C. section 119 of U.S. Provisional Patent Application No. 61/786,709 entitled "Dispersants" filed on Mar. 15, 2013, and which is in its entirety herein incorporated by reference.

FIELD OF THE INVENTION

The present invention relates generally to dispersants. More specifically, this invention relates to the novel dispersants based on branched ester alcohols. More particularly, the invention relates to derivatives of branched ester alcohols that serve as dispersants for thermoplastic polymers.

This invention also relates to methods of making branched ester alcohols derivatives as dispersants, and specifically to methods of synthesizing said dispersants.

The invention further relates to novel molecules based on branched ester alcohols that are particularly useful as dispersants and wetting agents for thermoplastic polymers in aqueous dispersions.

This invention also relates to new and useful aqueous and non-aqueous liquid pigment dispersions incorporating branched ester alcohols based dispersants which are easy to handle and produce thorough and effective colorations within target media, particularly as compared to standard solid pigments or high-viscosity liquid pigment dispersions.

This invention also features new and useful aqueous and non-aqueous high performance thermoplastic polymer dispersions incorporating branched ester alcohols based dispersants which are easy to handle and produce thorough and effective colorations within target media, particularly as compared to standard solid pigments or high-viscosity liquid pigment dispersions.

The present invention further relates to a class of branched ester alcohols based dispersants for aqueous and non-aqueous systems which can disperse pigments and polymers in said liquids within a short period of time and thereby give dispersions showing good dispersion stability for a prolonged period of time.

Furthermore, the invention relates to dispersants which, when pigments insoluble in organic liquids are dispersed in said organic liquids in the presence thereof, can provide dispersions particularly excellent in flowability and dispersion stability.

The invention further relates to an aqueous dispersion which includes a polyaryletherketone or sulphone polymer or copolymer and the use thereof in the coating of substrates.

BACKGROUND OF THE INVENTION

The introduction of solids into liquid media requires high mechanical forces. This depends substantially on the wettability of the solid by the surrounding medium and on the affinity to this medium. For the purposes of reducing these dispersing forces it is conventional to use dispersants facilitating the dispersion. These are mostly surfactants or tensides having an anionic, cationic or a non-ionic structure. These agents are directly applied to the solid or added to the dispersing medium in relatively small amounts.

It is further known that these solids tend to flocculate following the dispersion, which nullifies the work earlier done and leads to serious problems. These problems have been accounted for by the London/van der Waal's forces by which the solids attract each other. For the purposes of counteracting these attractive forces absorption layers must be applied to the solid. This is done by using such tensides.

During and following the dispersion there is an interaction between the surrounding medium and the solid particle, resulting in a desorption of the tenside by exchange for the surrounding medium present in a higher concentration. This medium, however, is not capable in most cases of building up such stable absorption layers, resulting in a crash of the whole system. This becomes apparent by the increase in viscosity in liquid systems, losses of gloss and color shifts in lacquers and coatings as well as insufficient color force development in pigmented synthetics.

To solve this problem, e.g., EP-A 154,678, EP-A 74080, U.S. Pat. No. 4,032,698 and DE-A 24 38 414 propose the use dispersants. These dispersants, however, only lead to a partial solution, particularly with respect to the miscibility without flocculation of different pigments with each other, such as organic pigments and inorganic pigments. Moreover, the pigment pastes prepared by the methods defined tend to interact with the surrounding medium, e.g., after use in lacquers. Consequently, it can be assumed that the absorption layers built up only have insufficient stability against desorption. A number of dispersants proposed in these publications further have the drawback that the storage stability is too poor, which leads to precipitation, phase separation, crystallization, etc. This results in that such products are inhomogeneous and useless in practice after a relatively short time.

It is also known that pigments are widely used as colorants, for example, in paints, varnishes, and inks Such pigments generally have average particle sizes (diameters) in the range of 0.1 to 10 micrometers, more typically, 1 micrometer or greater. To achieve these particle sizes, mechanical devices are most often used to comminute solid particulate into smaller primary particles. The most common mechanical devices include ball mills, attritors, sand/bead mills, and roll mills. All of these devices require moving parts in order to generate the mechanical forces required to break up the pigment particles. Milling times of several hours are typical, with certain pigments requiring a day or longer in order to break up, or comminute, the particles. Moreover, comminution of the pigment by contact with the milling media results in pigment surfaces exhibiting a high number of surface asperities. Furthermore, contamination of the dispersions from the mechanical parts of the milling equipment can result due to the intimate contact of the pigment with the milling media. Silicon dioxide, a grinding medium, is a common contaminant found after sand milling, for example.

Another disadvantage of mechanical processing of pigments is the large breadth of distribution of particle sizes resulting from such processes. This results in the presence of particles having diameters of one micrometer or greater, even in dispersions where the average particle size is significantly less. For dispersions requiring transparency in the final article, these larger particles lead to unwanted light scattering and are detrimental. The presence of these micrometer sized particles also leads to inherent instability, or tendency to flocculate, in the dispersions.

More stable pigment dispersions can be obtained by chemically altering the pigment. This often results in smaller average particle diameters but has the disadvantages of requiring a chemical pretreatment of the pigment, still requiring mechanical milling, and still providing a dispersion having a wide particle size distribution.

Current pigment dispersants are effective to some degree in dispersing a pigment in a higher concentration in a non-aqueous dispersion medium and in stabilizing the dispersion, but do not offer a satisfactory effect on stabilization of a fine dispersion of the pigment.

The products commonly employed in the prior art i.e, carbon black dispersants in coatings are salts of an acrylic acid copolymer, acetylenic diol surfactants, or polyalcohol ethers which fit into various classes of wetting and dispersing agents, (Calbo, Handbook of Coatings Additives, Dekker pg. 516). Such additives could be called on to function as more than a dispersant and can also act in one or more of the following ways: a) to prevent flocculation, b) to prevent hard settling, c) to improve jetness/color/gloss, d) to control viscosity, and/or e) to improve wetting of the base resin.

Various considerations are important in determining the usefulness of any additive as a dispersing agent for use with a carbon black or with other pigments, depending upon the product into which such a dispersion is to be incorporated. When used throughout this application the terms pigment(s) or pigment dispersion(s) are intended to encompass various materials which may be intended to impart either color and/or serve some other function, such as for example the use of carbon black in rubber where, in addition to adding color, such also acts as a reinforcing agent.

One of the most important considerations in determining whether a particular dispersant will be useful for use with a given pigment or pigments when such a pigment is to be used in a paint or coating composition is whether such a dispersant/pigment combination will or will not impart a conductive nature or characteristic to the dried paint film or coating into which it has been added.

The automotive industry is replacing and will continue to replace exterior metal body panels on vehicles with plastic and composite body panels. Some reasons for this change are weight reduction, flexibility of design, and lower tooling costs. The replacement of metal body panels by plastics and composites is not without difficulties.

One problem of note is the electrostatic spray painting of plastics. Electrostatic spray painting is the preferred manner of applying automotive topcoats. Spray painting normally gives the best appearance to the vehicle and the electrostatic technique assures the most economical use of the material. The problem arises because plastics do not paint well electrostatically unless a conductive primer is used.

Amongst the most important considerations for determining the utility of any dispersant to be used in conjunction with conductive carbon blacks are the following: the inherent rheological stability of the dispersion, both alone and when added to a formulated paint; resistance to flocculation of the carbon black/dispersant mixture and in the final paint or coating; and ability to achieve low viscosity at high pigment loadings.

The various prior art references of which the applicants are aware which relate to dispersing agents for pigment additives, such as carbon blacks, suffer from a number of shortcomings. The most significant shortcomings of the carbon black dispersants of the prior art, including those used for conductive carbon blacks, are: high levels of dispersant may be required which tends to detrimentally affect the physical properties of formulated paints, such as adversely affecting the resultant humidity resistance, yellowing upon exposure to UV light, loss of cure in melamine cross-linked systems, and other undesirable effects; inability to prevent reflocculation of carbon black, resulting in the loss of electrical conductivity in dried paint films; and incompatibility of the dispersant with the particular resin system selected for use in the final paint formulation.

Additionally, more and more paints are produced which are water-based and completely free from organic solvents, such as glycol ethers. When toning these paints to the desired colour, use is made to a great extent of pigment dispersions, which can be used both for water-based paint and for paint based on organic solvents. The pigment dispersions are normally composed of pigments, fillers, dispersing agents and an aqueous phase in the form of ethylene glycol, di- and triethylene glycol, propylene glycol, dipropylene glycol, tripropylene glycol and glycerol. In most cases, the dispersing agent is a nonionic surface-active compound or a combination of nonionic and anionic surfactants. For environmental reasons, it is however desirable that the pigment dispersions are solvent-free.

Additionally, aqueous dispersions of polymers are useful in a variety of coating applications. In particular, the dispersion of high performance polymers in water allows them to be applied to substrates by a method in which the dispersion of polymer particles is applied to a substrate at high temperature resulting in the formation of a fine polymer coating on the substrate with the simultaneous decomposition and flashing off of the dispersant.

Polyaryletherketone and sulphone polymers or copolymers can be more difficult to apply as coatings to substrates compared to many other functional coatings. This is often due to a combination of high processing temperatures, low resin elongation and rapid crystallisation kinetics. For example, polyetheretherketone melts at 340° C. and has a processing temperature range from 380° C. to 400° C. Substrates for receiving polyetheretherketone coatings must be able to stand such processing temperatures for at least an hour. Furthermore, substrates must not out-gas or form loose or brittle surface oxides.

It is known in the context of polymeric materials other than polyaryletherketone or sulphone polymers or copolymers to form aqueous dispersions of polymeric materials and to use such dispersions to form coatings on substrates. However, polyaryletherketones and sulphones cannot readily be dispersed in water and used in coatings.

Applicant is unaware of any commercially available aqueous dispersion of polyaryletherketone or sulphone polymers or copolymers and/or the use of such a dispersion in coating of substrates.

Obtaining stable aqueous dispersions of such high performance polymers as polyetheretherketone, polyethersulfone and polytetrafloroethylene has remained a challenge. These high molecular weight polymers are difficult to wet with conventional dispersants.

Applicant has discovered and synthesized novel dispersants based on branched ester alcohols that are exemplary dispersants and wetting agents for polymers in aqueous dispersions. The disclosed dispersants also generate far less foam in aqueous dispersions compared to standard alkylsulfosuccinates.

OBJECTS OF THE INVENTION

It is a first object of the present invention to provide novel dispersants.

It is a second object of the present invention to provide novel aqueous dispersions of high performance thermoplastic polymers incorporating novel dispersants.

It is another object of the instant invention to provide novel pigment dispersions containing dispersants based on branched ester alcohols.

It is a further object of the instant invention to provide thermoplastic polymer dispersions containing dispersants based on branched ester alcohols.

A further object of the invention is to provide novel carbon black dispersions containing novel dispersants of the invention.

A still further object of the invention is to provide novel carbon black dispersions incorporating dispersants based on branched ester alcohols.

Still, another object of the invention are pigment dispersions having a very high tinctorial strength and brilliance, an excellent levelness and covering power in opaque applications.

A further object of the invention is to provide thermoplastic and/or thermosetting polymer dispersions, or polymer compositions useful in coating applications that incorporate branched ester alcohols based dispersing agent.

Yet another object of the invention is to provide aqueous dispersions of polyetheretherketone, polyethersulfone and polytratefluoroethylene polymers.

These and other objects of the present invention will more readily become apparent from the description and examples which follow.

SUMMARY OF THE INVENTION

The invention provides a dispersant selected from the group consisting of compounds of the formula:

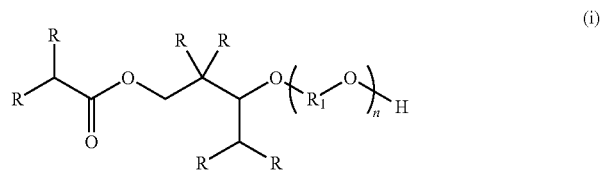
(i)

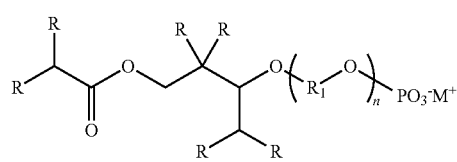
(ii)

(iii)

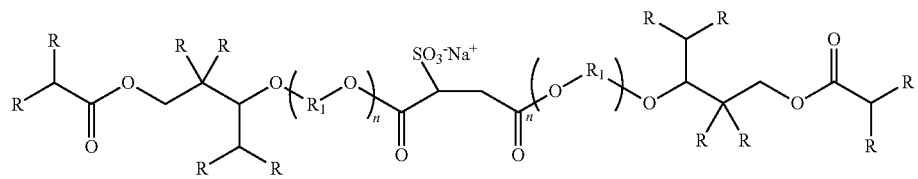
(iv)

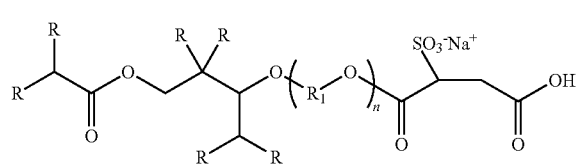
(v)

where R is independently selected from the group consisting of H and $C_1$-$C_{10}$ alkyl;

$$R_1 = -CH_2-CH_2- \text{ or } -CH_2-\underset{\underset{CH_3}{|}}{CH}-;$$

n= from about 1 to about 100; and $M^+$ is an alkali metal cation or ammonium cation and $NR_3^+$ is a trialkylammonium group where each R group has 1-5 carbon atoms.

The invention also provides an aqueous polymer dispersion comprising: (a) a thermoplastic resin; and (b) a dispersant selected from the group consisting of compounds of the formula:

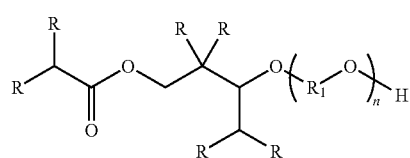
(i)

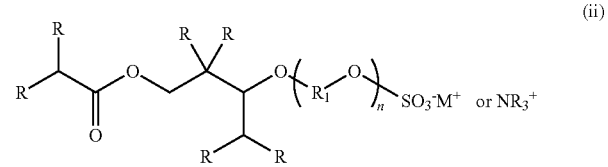
(ii)

-continued

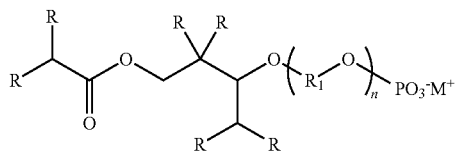
(iii)

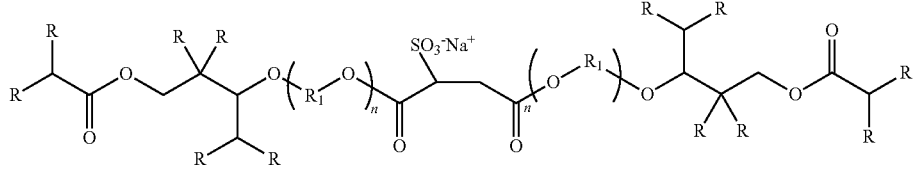
(iv)

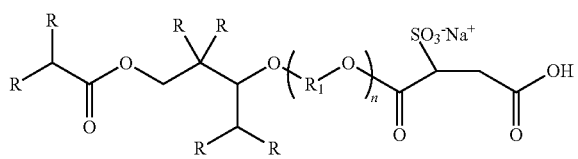
(v)

where R is independently selected from the group consisting of H and $C_1$-$C_{10}$ alkyl;

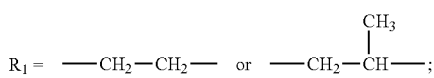

n= from about 1 to about 100; and $M^+$ is an alkali metal cation or ammonium cation and $NR_3^+$ is a trialkylammonium group where each R group has 1-5 carbon atoms.

DETAILED DESCRIPTION OF THE PRESENT INVENTION

In a first aspect of the invention, the compositions of the present invention are derivatives of branched ester alcohols. The compositions may be nonionic or anionic. The nonionic compositions of the present invention are represented by formula (i)

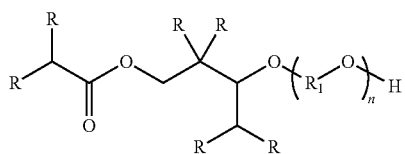
(i)

where R is independently selected from the group consisting of H and $C_1$-$C_{10}$ alkyl. The $C_1$-$C_{10}$ alkyl group may be primary, secondary or tertiary alkyl. Representative alkyl groups include methyl, ethyl, propyl, isopropyl, butyl, isobutyl and the like;
where

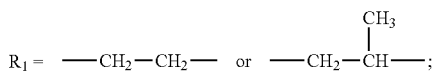

and n= from about 1 to about 100 and more preferably from about 1 to about 50.

The compositions of formula (i) may be conveniently prepared by alkoxylation of the ester alcohol. The preferred ester alcohol is 2,2,4-trimethyl-1,3-pentanediol monoisobutyrate. More specifically the process for alkoxylation includes the steps of: adding the catalyst to the organic compound containing at least one hydroxyl group; heating and pressurising a reactor containing the hydroxyl containing organic compound; supplying the alkylene oxide to said organic compound and catalyst at a process temperature of between 50° and 250° C. and at a pressure of between 100 and 700 kPa and isolating the alkoxylation products.

An important factor in obtaining the properties of the compounds is the numerical value of n. Indice n defines the number of alkylene oxide groups. It being possible for n to adopt values of from about 1 to about 100, preferably from 1 to 50. The skilled worker is well aware that the compounds are present in the form of a mixture having a distribution governed essentially by laws of statistics.

Anionic compositions of the present invention are represented by formulas (ii) and (iii)

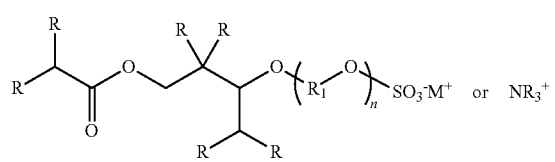
(ii)

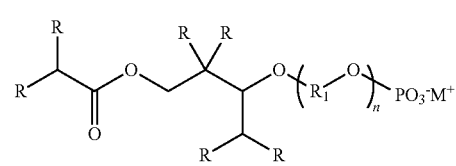
(iii)

are produced by the phosphation or sulfation of the compositions of formula (i).

The sulfation is accomplished with sulfamic acid in a glass reactor equipped with a stirrer, thermometer, and reflux condenser by heating to 120° C. until the %sulfate was >90%. The phosphation is typically conducted with one mole of phosphorus pentoxide (P2O5) in a glass reactor equipped with a stirrer, thermometer, and reflux condenser by heating to 70° C. until the reaction was complete. The product phosphoric acid ester, a mixture of mono- and diesters, was neutralized with aqueous ammonium hydroxide. The product is isolated as the ammonium salt in aqueous solution.

Other anionic derivatives of the branched ester alcohols are represented by formulas (iv) and (v)

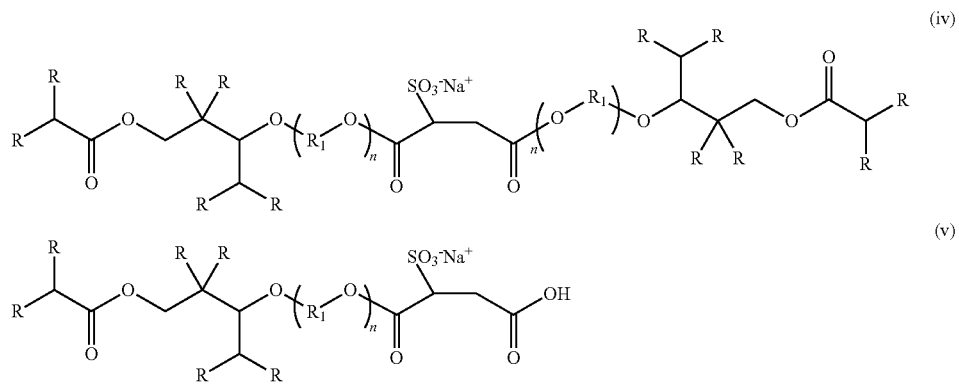

and they are the reaction products of two and one moles respectively of the branched ester alcohol or alkokylated ester alcohol with maleic anhydride that has been subjected to a further sulfonation reaction.

The compounds of formula (i)-(v) and derivatives thereof are very useful as a pigment dispersant for non-aqueous dispersions, aqueous dispersions and dispersions containing both water and organic solvents.

The compounds of formula (i)-(v) and derivatives thereof are very useful as dispersants for high performance thermoplastic polymers and various types of dispersions such as non-aqueous dispersions, aqueous dispersions and dispersions containing both water and organic solvents can be made. Particularly although not limited to those polymers, the preferred thermoplastic polymers are selected from the group consisting of polyetherketone, polyetheretherketone, polysulfone, polyethersulfone, polyfluoroolefins and copolymers therof, polyphenylenesulfide, poly-carbonates, aromatic polyesters and mixtures therof.

In the present specification, the term "non-aqueous" denotes a composition into which no water has been specifically introduced. Due to the possibility of atmospheric water being introduced through exposure to a relatively humid environment, this term does not rule out the potential for any water to be present through such a manner. The term "liquid dispersion" is intended to encompass any composition which is present in a fluid state (i.e., possessing a viscosity of below about 10,000 centipoise at standard temperature and pressure).

The non-aqueous solvent usable in the present invention varies depending upon the use of the pigment dispersion of the present invention. For instance, examples of the non-aqueous solvent for use in paints are usual organic solvents such as esters, ethers, ketones, alcohols, and aromatic solvents. Examples of other non-aqueous solvent include alcohols such as ethanol, isopropanol, butanol, as well as $C_5$-$C_{22}$ alcohols, the glycol ethers such as ethylene glycol monoethyl ether, diethylene glycol monoethyl ether, diethylene glycol dimethyl ether and dipropylene glycol monoethyl ether, glycol monoether acetates such as ethylene glycol monoethyl ether acetate, propylene glycol monomethyl ether acetate and diethylene glycol monoethyl ether acetate, ketones such as cyclohexanone and methyl ethyl ketone, amides such as N,N-dimethylacetamide and N-methylpyrrolidone, lactones such as .gamma.-butyrolactone, and acetic acid esters such as butyl acetate and isopropyl aceate. Preferable as the non-aqueous solvent for use in printing inks, particularly offset printing inks are lipophilic solvents such as vegetable oils and mineral oils.

In applications where resins are present, plasticizers are an important component of the formulation. Examples of plasticizers that are suitable include benzyl butyl phthalate, dibutyl phthalate, triphenyl phosphate, 2-ethyl hexyl benzyl phthalate and dicyclohexyl phthalate. Other well-known plasticizers which may be employed include dinonylphthalate, diisononylphthalate, diallyl phthalate, dibenzyl phthalate, butyl cyclohexyl phthalate, mixed benzoic acid and fatty oil acid esters of pentaerythritol, poly(propylene adipate)dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di 2-ethylhexyl ester of hexamethylene diphthalate, and di(methylcyclohexyl)phthalate. The particular plasticizer and the amount thereof used are chosen in accordance with the demand for compatibility.

The pigment of the dispersion of the present invention may be selected from inorganic pigments (such as carbon black pigments, e.g., furnace blacks, electrically conductive carbon black pigments, extender pigments and corrosion inhibitive pigments); organic pigments; dispersed dyes; and mixtures thereof. Examples of organic pigments that may be present in the pigment dispersion include, but are not limited to, perylenes, phthalo green, phthalo blue, nitroso pigments, manoazo pigments, diazo pigments, diazo condensation pigments, basic dye pigments, alkali blue pigments, blue lake pigments, phloxin pigments, quinacridone pigments, lake pigments of acid yellow 1 and 3, carbazole dioxazine violet pigments, alizarine lake pigments, vat pigments, phthaloxy amine pigments, carmine lake pigments, tetrachloroisoindolinone pigments and mixtures thereof. Inorganic pigments that may be present in the pigment dispersion, include, for example, titanium dioxide, electrically conductive titanium dioxide, and iron oxides, e.g., red iron oxides, yellow iron oxides, black iron oxides and transparent iron oxides. Extender pigments that may be present in the pigment dispersion include, but are not limited to, silicas, clays, alkaline earth metal sulfates and carbonates, such as calcium sulfate, magnesium sulfate, barium sulfate, and calcium carbonate. The pigment dispersion may contain corrosion inhibitive pigments, such as aluminum phosphate and calcium modified silica. Mixtures of organic and inorganic pigments are also suitable for making the dispersions of the present invention.

Pigment blacks with an average primary particle diameter of 8 to 80 nm, preferably 10 to 35 nm, and a DBP number of 40 to 200 ml/100 g, preferably 60 to 150 ml/100 g, can be used as the carbon black. In a preferred embodiment of the invention, gas blacks with an average primary particle diameter of 8 to 30 nm, preferably 10 to 25 nm, can be used.

The pigment dispersions according to the invention contain 1 to 85% by weight, preferably 30 to 80% by weight, of pigment, 0.5 to 35% by weight, preferably 1 to 20% by weight, of the dispersant of the invention, 0 to 20%, preferably 0 to 5%, of additional nonionic or anionic surface-active agents if necessary, and 25 to 60% by weight of a solvent.

The amount of dispersants depends on the specific materials employed and the concentration of pigment in the dispersion required. For inorganic pigments, such as titanium dioxide and iron oxide pigment, the amount used is typically in the range 0.02 to 20%, commonly 0.05 to 10% and more usually 0.1 to 5.5%, by weight of the pigment; for organic pigments such as phthalocyanines, somewhat higher levels of dispersant may be used, typically in the range 0.02 to 50%, more usually from 0.1 to 30%, by weight of the pigment; and for carbon black the amount of dispersant is typically in the range 0.02 to 30%, more usually from 0.1 to 20%, by weight of the pigment.

When incorporated into end use products such as paints or surface coatings typical pigment levels on the final product will be from about 0.02 to about 40%, particularly about 0.1 to about 25%, pigment by weigh based on the total paint or surface coating. Where coloured inorganic pigments are used, the levels will typically be from about 0.05 to about 25%, particularly about 0.2 to about 15%, for white pigments, particularly titanium dioxide, the pigment may be present to provide opacity and not just colour and will often be present at concentrations e.g. in base paint formulations, of up to 25%, typically from 0.2 to 25%, by weight; for organic pigments, especially phthalocyanine pigments, the levels will typically be up to about 10% typically from about 0.05 to about 8%, particularly about 0.1 to about 5%; and for carbon black the levels will typically be from about 0.05 to about 10%, particularly about 0.2 to about 5%.

The non-aqueous pigment dispersion composition of the present invention is prepared by adding a pigment to a non-aqueous solution of a pigment dispersant, disaggregating and dispersing the pigment in the solution by means of a dispersing machine such as roll mill, ball mill or sand mill, diluting the resultant dispersion to a desired concentration and removing larger particles therefrom by way of centrifugation, Scharples-type centrifugation and filtration. If a desired particle-size distribution cannot be obtained by the first particle classification process, the dispersing process and particle classification process are repeated until the desired particle-size distribution is obtained. In most instances, if the proportion of particles impassable through a sieve having a mesh size of 300 nm is not greater than 30%, there is no need for particle classification. Thus, the pigment contained in the dispersion has a median particle size of not greater than 250 nm, preferably not greater than 200 nm with not greater than 30% of the pigment particles being impassable through the sieve having a mesh size of 300 nm.

Also, the pigment dispersion according to the invention can be produced by first preparing a pigment-free mixture of the surface-active compounds, the non-aqueous solvent, the antifoaming agents and any other additives, and subsequently adding the pigment portion which is dispersed in the mixture. The dispersion can be carried out by means of a dissolver or grinder, for instance a ball grinder or roller mill.

The dispersion of the invention is preferably storage stable. By this term, it is intended that the inventive dispersion will remain in a fluid state with substantially no precipitation or reagglomeration of pigment for at least 60 days while being continuously exposed to a temperature of at least 50° C. Such a test is one manner of reproducing long-term storage conditions and thus is not intended as being the sole limitation of temperature within this invention. One of ordinary skill in this art would appreciate the need to provide a modified test of this nature. Thus, the inventive dispersions must merely exhibit substantially no precipitation and retention of its fluid state (low viscosity) after exposure to high temperature storage for 60 days.

The pigment dispersions according to the invention can be employed for all purposes and are excellently suitable for the production of emulsion paints based on polyvinyl acetate, polyvinyl acetate copolymers, styrene-butadiene copolymers, polyvinyl propionates, acrylic and methacrylic acid ester polymers, saponified alkyd resins and oil emulsions; for the production of wallpaper paints based on cellulose derivatives such as methylcellulose, hydroxymethylcellulose and carboxymethylcellulose, and for the production of printing inks which contain, as binders, mainly saponified natural resins, such as shellac, saponified water-soluble synthetic resins or acrylate binder solutions.

The dispersants (i)-(v) of the invention find uses in many applications. In many applications it disperses pigment, polymer, plasticizer, and plastisols. In both applications, lower viscosity and higher color yield for the pigment resulted. When lower viscosity is achieved, it allows either increased shear of the particulate matter added, be it pigment or dyes. In the case of pigment, this offers increase color strength; thus, saving money for the end user. The dispersant of the invention does not coalesce the polymer, but lowers the particle size of it, which makes for a more efficient coating. This offers what is known as 'plate out' prevention with injection plastisol machines.

The dispersants of the invention also work with Pigment Red 57:1, diiso-nonyl phthalate, and florescent pigments, which are made with formaldehyde resins, benzoquinoneimines, and melamine formaldehyde. They are essentially dyed polymers. The also work with any oil, or liquid plastic (plastizol) dispersion, where water is not present, and pigment, dye, or any particulate matter has to be dispersed. This includes inks, paints, any coating. Possibilities are solvent-borne resins, which include Alkyds, Alkyd Copolymers, Oil Modified Urethanes (OMU), Polyesters and Solution Acrylics.

Although Applicant does not wish to be bound by theoretical explanations of interfacial phenomena, it is believed that the dispersant of the invention works by drastically lowering the interfacial tension of the polymer/plasticizer and the pigment. When shear is applied, the polymer/plasticizer and pigment breaks into smaller particles. Since the dispersant of the invention has a high affinity for low HLB type polymers, steric hindrance takes place to keep the particles evenly spaced in a lower energy state. This allows for further development of the pigment color using the conventional dispersing equipment. After a lower viscosity is attained, many options exist for the user. Higher solids can be gained on pigment, resin, or plasticizer, not to mention the possible increase in color yield.

In another preferred embodiment of the invention, additives useful for making synthetic resin products are dispersed into the resins using the dispersants (i)-(v) of the present invention. The dispersant of the invention may be added or injected directly into a polymer melt or into a polymer solution using a solvent. The dispersant is added in the range of 0.01% to 30% by weight of the resin and the additive is present in the range of 0.01% to 40% by weight.

The additives that can be added to the resins are selected from the group consisting of (i) one or more mineral fillers, organic fillers of natural or synthetic origin or a mixture thereof wherein said one or more mineral fillers is selected from the group consisting of titanium dioxide, natural calcium carbonate, precipitated calcium carbonate, magnesium carbonate, zinc carbonate, dolomite, lime, magnesia, barium sulfate, calcium sulfate, aluminum hydroxide, magnesium hydroxide, silica, wollastonite, clays, talc, mica, solid glass spheres, hollow glass spheres, and metal oxides and wherein said organic fillers are selected from the group consisting of organic materials of natural and synthetic origin, and (ii) one or more additives selected from the group consisting of antioxidants, metal deactivators, light stabilizers, pvc stabilizers, plasticizers, lubricants, processing aids, impact modifiers, fiber reinforcements, flame retardants, antistatic agents, fluorescent whitening agents, biostabilizers, antimicrobials, chemical blowing agents, organic peroxides, nucleating agents, polymerization catalysts, grafting catalysts, thermal stabilizers, photochemical stabilizers, shrink-preventive agents, antistatic agents, mold-release agents, glass fibers, and mineral thickeners and mixtures thereof, and mixtures of (i) and (ii).

The thermal stabilizing agent is an antioxidant and is selected from the group consisting of: tetrakis[methylene 3-(3',5'-di-tert-butyl-4'-hydroxyphenyl)-propionate]-methane, octadecyl 3-(3',5'-di-tert-butyl-4-hydroxyphenyl)propionate, 1,3,5 -trimethyl-2,4,6-tris-(3,5-di-tert-butyl)-4-(hydroxyl-benzyl)benzene, bis(2,4-di-tert-butyl-phenyl) pentaerythritol diphosphite, tris(mono-nonylphenyl) phosphite, 4,4'-butylidene-bis(5-methyl-2-tert-butyl)phenol, tris(3,5-di-tert-butyl-4-hydroxybenzyl)isocyanurate, tris-nonylphenyl phosphite, distearyl pentaerythritol diphosphite, tetrakis-(2,4-di-tert-butylphenyl)-4,4'-biphenylene diphosphonite, tris-(2,3-di-tert-butylphenyl)-phosphite, butylated hydroxy toluene, dicetyl thiodipropionate, dimyristyl thiodipropionate, and poly(1,4-cyclohexylene-3,3'-thiodipropionate, partially terminated with stearyl alcohol, as well as mixtures of any two or more thereof.

Typical antistatic agents are selected from the group consisting of glycerol monostearates, ethoxylated amines, polyethylene glycols, and quaternary ammonium compounds, as well as mixtures of any two or more thereof.

The coupling agents are selected from the group consisting of silanes titanates, chromium complexes, carboxyl-substituted polyolefins, carboxyl-substituted acrylates, and paraffins, as well as mixtures of any two or more thereof.

The UV stabilizers are selected from the group consisting of 2-hydroxy-4-octoxybenzophenone, 2-hydroxy-4-isooctoxy-benzophenone, 4-hydroxy-4-n-dodecycloxybenzophenone, 2-(3-di-tert-butyl-2-hydroxy-5-methylphenyl-5-chlorobenzyltriazole, 2-(2-hydroxy-3,5-di-tert-amylphenyl)-benzotri-azole, para-tert-butylphenyl salicylate, 2,4-di-tert-butylphenyl-3,5 -di-tert-butyl-4-hydro-xybenzoate, nickel bis-ortho-ethyl(3,5-di-tert-butyl-4-hydroxybenzyl)phosphonate, and 2,2',6,6'-tetramethyl-4-piperidinyl sebacate, as well as mixtures of any two or more thereof.

The flame retardant is selected from the group consisting of: decabromodiphenyl oxide, dodecachlorodimethane dibenzocyclooctane, ethylene bis-dibromo norbornane dicarboxamide, ethylene bis-tetra-bromophthalimide, and antimony trioxide, as well as mixtures of any two or more thereof.

The metal deactivating agent is selected from the group consisting of oxalyl bis-(benzylidene hydrazide), and 2,2'-oxamido bis-(ethyl 3-(3,5-di-tert-butyl-4-hydroxyphenyl) propionate, as well as mixtures of any two or more thereof.

The nucleating agent is selected from the group consisting of sodium benzoate, diphenyl phosphinic acid, the magnesium, sodium, calcium, and aluminum salts of diphenyl phosphinic acid, phenyl phosphinic acid, the magnesium, sodium, calcium, and aluminum salts of phenyl phosphinic acid, phenyl phosphorous acid, and the magnesium, sodium, calcium, and aluminum salts of phenyl phosphorous acid, as well as mixtures of any two or more thereof.

The resins are selected from the group consisting of (a) a thermoplastic resin selected from the group consisting of (i) low- or high density polyethylene, linear or branched, (ii) homo- or copolymeric polypropylenes, (iii) polyisobutylenes, (iv) copolymers of two or more of the monomers, ethylene, propylene, and butylene, (v) polyvinyl chlorides, polystyrenes, and polyolefins, optionally halogenated and optionally modified by grafting or copolymerization; polyesters, polyamides, polyolefins, polyfluoroolefins such as polytetrafluoroethylene, polyethereetherketones, aromatic polyesters, polyetherketones, polysulfones, polyphenylene sulfides and polycarbonates, or a thermosetting resin selected from the group consisting of acrylic resins, phenolic resins, amino-plastic resins, epoxy resins, reactive resins used to produce polyurethanes, alkyd resins, and unsaturated polyester resins produced by condensation reactions of maleic anhydride with or without the presence of phthalic derivatives with an alkylene glycol or a low molecular weight polyalkylene glycol, in styrene wherewith said polyester is copolymerizable with said styrene.

The method of manufacturing filled polymer compounds which are preferably flowable and homogeneous (i.e., well mixed) according to the invention, is characterized in that the inventive dispersing agent is added to the mineral and/or organic fillers prior to their introduction to the resin, or to the resin prior to or after the introduction of said fillers to the resin.

The polymer compositions of the invention may be employed in any method of forming or processing of thermoplastics, such as extrusion, injection molding, calendering, etc.

In another aspect of the invention, there is provided an aqueous dispersion comprising: (A) water; (B) a thermoplastic polymeric material of a type which includes: (i) phenyl moieties; (ii) carbonyl and/or sulphone moieties; (iii) ether and/or thioether moieties and (iv) aromatic ester moieties; and (C) at least one dispersing agent having formulas (i) through (v) as shown above.

Typically the dispersions contains 5% to 75% by weight of the thermoplastic polymeric material and 0.1% to 15% by weight of the dispersants of formula (i)-(v) with the remainder being the water for making the dispersion.

The invention also provides an aqueous coating composition comprising a dispersion of 10-75% by weight of a thermoplastic resin dispersed in 30-90% by weight of water;

wherein the dispersed thermoplastic are dispersed by about 0.1-10.0% by weight of a dispersant of the formula (i) to (iv).

EXAMPLES

The following examples are intended to demonstrate the usefulness of the compositions of the present invention and should not be construed to limit the scope of the invention in anyway.

Example 1

Anionic compositions of formula (ii) were synthesized by the following general method. 500 g of 2,2,4-trimethyl-1,3-pentanediol monoisobutyrate or alkoxylated 2,2,4-trimethyl-1,3-pentanediol monoisobutyrate were charged to a 1 L four-neck round-bottom flask equipped with an overhead stirrer, nitrogen inlet, and thermocouple. 0.1% dicyandiamide was then charged to the reaction flask. The reaction mixture was heated to 80° C. and 0.9 eq. Sulfamic acid was slowly added. The reaction mixture was held at 100° C. for 2 hours and the reaction mixture was allowed to cool to 50° C. Deionized water was added to produce a 50% solution of the ammonium salt of the sulfated ester alcohol. Neutralization with potassium or sodium hydroxide yields the corresponding alkali metal salt. The sulfated ester alcohol and sulfated alkoxylated ester alcohols exhibited excellent wetting of a variety of substrates and produced very low foam.

Example 2

Anionic compositions of formula (iii) were synthesized by the following general method. 500 g of 2,2,4-trimethyl-1,3-pentanediol monoisobutyrate or alkoxylated 2,2,4-trimethyl-1,3-pentanediol monoisobutyrate were charged to a 1 L four-neck round-bottom flask equipped with an overhead stirrer, nitrogen inlet, and thermocouple. The reaction mixture was heated to 80° C. and 0.33 eq. Phosphoric anhydride was slowly added to produce an equimolar mixture of mono and diester. The reaction mixture was held at 100° C. for 2 hours and the reaction mixture was allowed to cool to 50° C. Deionized water was added to produce a 50% solution. Neutralization with potassium or sodium hydroxide yields the corresponding alkali metal salt. The phosphated ester alcohol and phosphated alkoxylated ester alcohols exhibited excellent wetting of a variety of substrates and produced very low foam.

Example 3

Anionic compositions of formula (iv) and (v) were synthesized by the following general method. 500 g of POE(3) 2,2,4-trimethyl-1,3-pentanediol monoisobutyrate were charged to a 1 L four-neck round-bottom flask equipped with an overhead stirrer, nitrogen inlet, and thermocouple. The reaction mixture was heated to 80° C. and either 1 eq. or 0.5 eq. maleic anhydride was charged slowly. The reaction mixture was held at 100° C. for 2 hours and the reaction mixture was allowed to cool to 50° to yield either the mono or diester of the alkoxylated 2,2,4-trimethyl-1,3-pentanediol monoisobutyrate and maleic anhydride. The sulfonated dispersants were synthesized by subjecting the mono or diesters of the alkoxylated 2,2,4-trimethyl-1,3-pentanediol monoisobutyrate and maleic anhydride to a standard sulfonation reaction using sodium bisulfite and subsequent addition of dionized water to form a 50% solution. The sulfonated mono or diesters of the alkoxylated 2,2,4-trimethyl-1,4-pentanediol monoisobutyrate and maleic anhydride exhibited excellent wetting of a variety of substrates and produced very low foam.

Examples 4-9

The dispersions in Table 1 were prepared by the following method. The dispersant was dissolved at 5 percent in the desired amount of water and the required loading of polymer was then slowly added to the stirred solution. The rate of addition was maintained such that all of the added polymer was completely wetted before additional polymer was added. Dispersion stability was evaluated by aging the dispersions at ambient temperature for 1 week and monitoring the amount of polymer that had settled.

Comparative examples 5 and 6 were prepared using the industry standard dispersant dioctylsulfosuccinate.

TABLE 1

| Examples | Polymer | Dispersant | % Solids | Stability |
|---|---|---|---|---|
| 4 | PEEK | formula (iv), R = methyl, $R_1 = CH_2CH_2$, n = 3 | 35 | excellent |
| 5 | PTFE | formula (iv), R = methyl, $R_1 = CH_2CH_2$, n = 3 | 60 | excellent |
| 6 | PEEK | formula (i), R = methyl, $R_1 = CH_2CH_2$, n = 12 | 35 | excellent |
| 7 | PTFE | formula (iii), R = methyl, $R_1 = CH_2CH_2$, n = 12 | 35 | excellent |
| 8 | PTFE | Dioctylsulfosuccinate | 60 | poor |
| 9 | PEEK | Dioctylsulfosuccinate | 35 | poor |

The branched ester alcohol based dispersants yielded more stable lower foam polymer dispersions compared to the corresponding polymer dispersions using the industry standard dioctylsulfo-succinate.

All patents, patent applications and publications cited in this application including all cited references in those patents, applications and publications, are hereby incorporated by reference in their entirety for all purposes to the same extent as if each individual patent, patent application or publication were so individually denoted.

While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting. It is to be understood that the terms used herein are merely descriptive rather than limiting and that various changes, numerous equivalents may be made without departing from the spirit or scope of the claimed invention.

What is claimed is:

1. A dispersant selected from the group consisting of compounds of the formula:

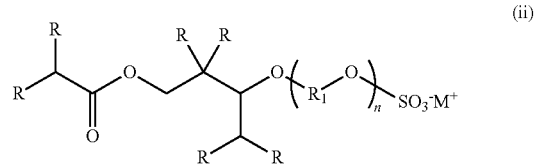

where R=methyl, $R_1$=—$CH_2CH_2$—, and n=12

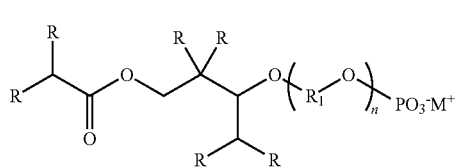
(iii)

where R=methyl, $R_1$=—$CH_2CH_2$—, and n=12;

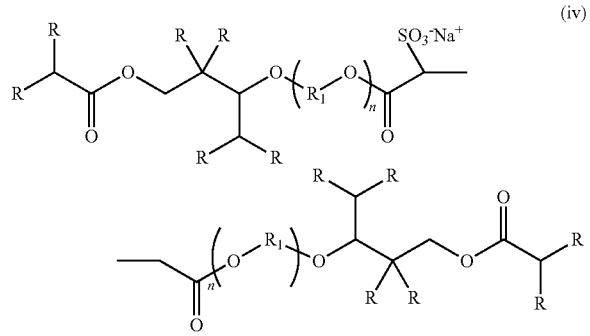
(iv)

where R=methyl, $R_1$=—$CH_2CH_2$—, and n=3; and

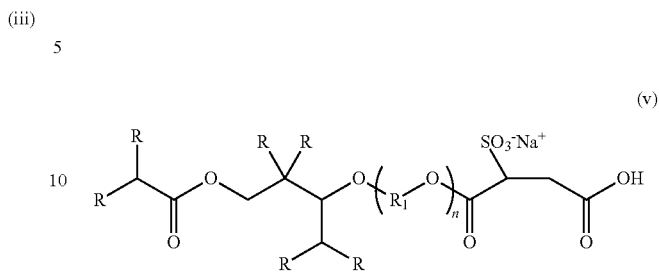
(v)

where R=methyl, $R_1$=—$CH_2CH_2$—, and n=3;

and $M^+$ is selected from the group consisting of an alkali metal cation, ammonium cation and a trialkylammonium group $HNR'_3{}^+$ where each R' group has 1-5 carbon atoms.

2. An aqueous polymer dispersion comprising: (a) a thermoplastic resin selected from the group consisting of polyetheretherketone polytratefluoroethylene and polyphenylenesulfide and (b) a dispersant of the formula:

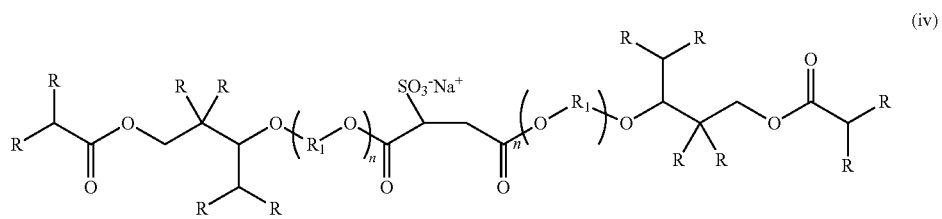
(iv)

where R=methyl;

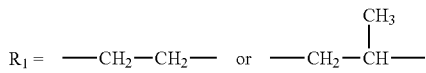

and n=from about 1 to about 100.

* * * * *